(12) United States Patent
Welch et al.

(10) Patent No.: US 6,384,161 B1
(45) Date of Patent: May 7, 2002

(54) METHOD AND CATALYST SYSTEM FOR PRODUCING POLYOLEFINS WITH BROADENED MOLECULAR WEIGHT DISTRIBUTIONS

(75) Inventors: M. Bruce Welch; David W. Dockter, both of Bartlesville, OH (US); Syriac J. Palackal, Riyadh (SA); Bryan E. Hauger, Claremore; David C. Rohlfing, Bartlesville, both of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/474,864

(22) Filed: Dec. 30, 1999

(51) Int. Cl.$^7$ .............................. C08F 4/02; C08F 4/52; C08F 4/642

(52) U.S. Cl. ...................... 526/129; 526/114; 526/119; 526/160; 526/943; 526/153; 502/103; 502/107; 502/110; 502/117

(58) Field of Search ................................ 502/103, 107, 502/110, 117; 526/114, 119, 129, 160, 943

(56) References Cited

U.S. PATENT DOCUMENTS 5,719,241 A * 2/1998 Razavi et al. ............... 526/119
6,207,606 B1 * 3/2001 Lue et al. .................... 502/113

* cited by examiner

Primary Examiner—David W. Wu
Assistant Examiner—R. Rabago
(74) Attorney, Agent, or Firm—Edward L. Bowman

(57) ABSTRACT

The present invention provides a process for preparing a supported metallocene catalyst system that can be used to catalyze formation of polyolefins having a wide molecular weight range. In accordance with the process of the present invention, a first portion of an inorganic oxide is dried under a first set of conditions, wherein upon treatment with an organoaluminoxide and a metallocene, a first catalyst system is formed usable to produce a polyolefin product having a first molecular weight average distribution. A second portion of an inorganic oxide under a second set of conditions, wherein upon treatment with an organoaluminoxane and a metallocene, a second catalyst system is formed usable to produce polyolefin product having a second molecular weight distribution. An amount of the first portion is mixed with an amount of the second portion to produce a final inorganic oxide support. The final inorganic oxide support is combined with an organoaluminoxane and a metallocene to produce a supported metallocene catalyst system usable to catalyze formation of polyolefins with a broadened molecular weight average distribution.

In another aspect, the present invention provides a process for polymerizing polyolefins using the inventive supported metallocene catalyst system. The process comprises preparing the final catalyst as mentioned above and then contacting an olefin with the final metallocene catalyst system under conditions supporting polymerization.

39 Claims, No Drawings ies conditions may also be mixed in any ratio to achieve broader molecular weight distribution than polyolefin produced by either catalyst system alone.

METHOD AND CATALYST SYSTEM FOR PRODUCING POLYOLEFINS WITH BROADENED MOLECULAR WEIGHT DISTRIBUTIONS

FIELD OF THE INVENTION

The present invention relates to a supported metallocene catalyst system having a modified support useful for the polymerization of olefins. More particularly, but not by way of limitation, the present invention relates to a supported metallocene system having supports modified by more than one drying condition. In another aspect the present invention relates to a method for polymerization of olefins with a broad molecular weight distribution using the inventive supported metallocene catalyst system.

BACKGROUND OF THE INVENTION

Metallocene catalyst systems are extensively used in a variety of polymerization systems, including the polymerization of olefins. The term "metallocene" as used herein refers to a compound containing at least one cyclopentadienyl-type group bonded to a transition metal. The transition metal is selected from Groups IVB, VB, and VIB, preferably IVB and VIB. Examples include titanium, zirconium, hafnium, chromium and vanadium. Generally, the more preferred catalysts in the polymerization of olefins are metallocenes of Zr, Hf, or Ti.

Generally, in order to obtain the highest activity from metallocene catalysts, it has been necessary to use them with an organoaluminoxane cocatalyst, such as methylaluminoxane. The resulting catalyst system is generally referred to as a homogenous catalyst system since at least part of the metallocene or the organoaluminoxane is in solution in the polymerization media. These homogenous catalysts systems have the disadvantage that when they are used under slurry polymerization conditions, they produce polymer which sticks to reactor walls during the polymerization process (generally referred to as "fouling") and/or polymer having small particle size and low bulk density which limits the commercial utility.

Various methods have been proposed in an effort to overcome the disadvantages of the homogenous metallocene catalyst systems. One such method involves the prepolymerization of the metallocene aluminoxane catalyst system and/or supporting the catalyst system components on a porous carrier (also known as a "particulate solid" or "support").

Another important consideration in development of metallocene catalysts is the molecular weight distribution of the solid polymer generated using such catalysts. Broad molecular weight distributions have been linked to improved processability and improved performance of the resulting polymer. Although there have been numerous approaches to broadening the molecular weight distribution of polymers generated from metallocene catalyst systems, there continues to be a need for improved techniques and catalysts.

One aim of the present invention is to provide a new method for preparing a supported metallocene catalyst system capable of producing polyolefins having a broad molecular weight distribution. In accordance with another aspect of the present invention, a method is provided for polymerizing olefins using the new type of supported metallocene catalyst system.

SUMMARY OF THE INVENTION

The present invention provides a process for preparing a supported metallocene catalyst system that can be used to catalyze formation of polyolefins having a wide molecular weight range. In accordance with the process of the present invention, a first portion of an inorganic oxide is dried under a first set of conditions, wherein upon treatment with an organoaluminoxide and a metallocene, a first catalyst system is formed usable to produce a polyolefin product having a first molecular weight average distribution. A second portion of an inorganic oxide under a second set of conditions, wherein upon treatment with an organoaluminoxane and a metallocene, a second catalyst system is formed usable to produce polyolefin product having a second molecular weight distribution. An amount of the first portion is mixed with an amount of the second portion to produce a final inorganic oxide support. The final inorganic oxide support is combined with an organoaluminoxane and a metallocene to produce a supported metallocene catalyst system usable to catalyze formation of polyolefins with a broadened molecular weight average distribution.

In an alternative embodiment, the inventive metallocene catalyst system is prepared by drying a first portion of an inorganic oxide under a first set of conditions and combining the first portion with an organoaluminoxane and a metallocene to create a first catalyst system usable to produce a polyolefin product having a first molecular weight average distribution. A second portion of an inorganic oxide is dried under a second set of conditions and combined with an organoaluminoxane and a metallocene to create a second catalyst system usable to produce a polyolefin product having a second molecular weight average distribution. An amount of the first catalyst system can be mixed with an amount of the second catalyst system to form a combined catalyst system usable to catalyze the formation of polyolefins having a broadened molecular weight average distribution.

In another aspect, the present invention provides a process for polymerizing polyolefins using the inventive supported metallocene catalyst system. The process comprises preparing the final catalyst as mentioned above and then contacting an olefin with the final metallocene catalyst system under conditions supporting polymerization.

DETAILED DESCRIPTION OF THE INVENTION

The present invention provides a particulate solid or "support," useful in forming a liquid catalyst system for the polymerization of olefins. Any number of supports can be employed as the particulate solid to be modified. Typically the support can be any inorganic oxide, including metal oxides such as silica, alumina, silica-alumina, and mixtures thereof. Other examples of inorganic oxides are magnesia, titania, zirconia, and the like. It is within the scope of the present invention to use a mixture of one or more of the particulate solids.

The present inventors have observed that the extent and type of drying influences the molecular weight distribution of polyolefin product. Combining metallocene catalysts with inorganic oxide dried under varying conditions allows a proportional modification of the molecular weight distribution of the catalyzed polyolefin. Thus, partially dried and more extensively dried inorganic oxide-metallocene catalyst preparations can be mixed in amounts effective to catalyze formation of desired molecular weight distributions of polyolefin, e.g. polyethylene, products. The polyolefin catalyzed by the mixed catalyst preparations will have a broader molecular weight distribution than polyolefin produced by either catalyst system alone. Catalysts prepared under varying drying conditions may be combined before or after TMA treatment in order to achieve a hybrid polyolefin product.

In accordance with a preferred embodiment of the present invention, the solid support is carefully dehydrated to a desired extent prior to use. Preferably for substantially complete dehydration, the solid is dehydrated so as to contain less than 7% weight loss on ignition. Complete or partial dehydration treatment may be carried out in substantial vacuum or while purging with a dry inert gas such as nitrogen or dry air at a temperature of about 20° C. to about 1200° C., and preferably, from about 300° C. to about 800° C. for substantially complete dehydration. Pressure considerations are usually not critical. The duration of thermal treatment can be from about 0.1 to about 24 hours, depending on the extent of thermal treatment desired.

In a preferred embodiment, the inorganic oxide support is placed in a ceramic tray which is then placed in a muffle furnace with ambient air. The temperature of the muffle furnace is increased at a rate of 10° C. per minute until the desired temperature is reached. The silica is left at the indicated temperatures for the desired time period, depending on the extent of dehydration desired. After removal from the muffle furnace the heated silicon dioxide is placed in a sealed container for further use.

Dehydration is preferably also accomplished by subjecting the solid to a chemical treatment to remove water and reduce the concentration of surface hydroxyl groups. Chemical treatment is generally capable of converting substantially all water and hydroxyl groups in the oxide surface to relatively inert species. Useful chemical agents are for example, trimethylaluminum, ethyl magnesium chloride, chlorosilanes such as $SiCl_4$, disilazane, trimethylchlorosilane, (dimethylamino)trimethylsilane and the like. Trimethylaluminum ("TMA") is a particularly preferred chemical agent.

The chemical dehydration can be accomplished by slurrying the inorganic particulate material such as, for example silica, in an inert low boiling hydrocarbon, such as for example, hexane. During the chemical dehydration treatment, the silica should be maintained in a moisture and oxygen free atmosphere. A low boiling inert hydrocarbon solution of the chemical dehydrating agent is then added to the silica slurry, such as, for example TMA. The solution is added slowly to the slurry. The temperature ranges during chemical dehydration reaction can be from about 20° C. to about 120° C., however, higher and lower temperatures can be employed. Preferably, the temperature will be from about 50° C. to about 100° C. The chemical dehydration procedure may be allowed to proceed until all the substantially reactive groups are removed from the particulate support material as indicated by cessation of gas evolution. Normally, the chemical dehydration reaction will be allowed to proceed from about 30 minutes to about 16 hours. Upon completion of the chemical dehydration, the solid particulate material may be filtered under a nitrogen atmosphere and washed one or more times with a dry, oxygen free inert solvent. The wash solvents as well as the diluents employed to form the slurry and the solution of chemical dehydrating agent can be any suitable inert hydrocarbon. Illustrative of such hydrocarbons are pentane, heptane, hexane, toluene, isopentane and the like.

Applicants believe that, like other forms of drying, the extent of chemical drying will affect the molecular weight distribution of the ultimate polyolefin products. Furthermore, it is believed that thermal dehydration can be dispensed with completely in accordance with the present invention. In such a case, the extent of dehydration will be controlled completely by the chemical drying of the support.

The specific particle size of the support or inorganic oxide, surface area, pore volume, and number of hydroxyl groups is not considered critical to its in the practice of this invention. However, such characteristics often determine the amount of support to be employed in preparing the catalyst compositions, as well as affecting the particle morphology of polymers formed. The characteristics of the carrier or support must therefore be taken into consideration in choosing the same for use in the particular invention.

The modified support, prepared as described above, is useful in forming a supported metallocene catalyst system. The supported catalyst system is prepared by contacting the modified support material with a solution of a metallocene catalyst component, which has been treated with an organoaluminoxane as described more filly below, and with ethylene.

A wide range of metallocenes is considered to be applicable to the present process. Particularly preferred metallocenes useful for this invention are those metallocenes discussed in U.S. Pat. No. 5,498,581, assigned to the assignee of the present invention. The metallocenes of the type contemplated as useful for the present invention include those represented by the formula:

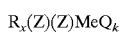

$$R_x(Z)(Z)MeQ_k$$

wherein each Z is bound to Me, is individually selected and is a cyclopentadienyl-type ligand selected from substituted or unsubstituted cyclopentadienyl, indenyl, benzoindenyl, tetrahydroindenyl, benzofluorenyl, octahydrofluorenyl, and fluorenyl ligands, as well as derivatives thereof;

wherein R is a structural bridge linking the Z's and is selected from the group consisting of hydrocarbyl groups, hydrocarbyloxy groups, silicon containing hydrocarbyl groups, germanium containing hydrocarbyl groups, tin containing hydrocarbyl groups, phosphorus containing hydrocarbyl groups, and nitrogen containing hydrocarbyl groups each having 1 to 20 carbon atoms;

wherein Me is a metal selected from the group consisting of Group IVB, VB, and VIB metals of the Periodic Table;

wherein each Q is individually selected from the group consisting of hydrogen, halogen, hydrocarbyl groups having 1 to 20 carbon atoms, alkoxy groups having 1 to 20 carbon atoms, amino groups which may or may not be substituted with up to two hydrocarbyl groups having 1 to 20 carbon atoms, a phosphorus-containing hydrocarbyl group having 1 to 20 carbon atoms, a silicon-containing hydrocarbyl group having 1 to 20 carbon atoms and an aluminum-containing hydrocarbyl group having 1 to 20 carbon atoms;

wherein x is 1 or 0; and wherein k is a number sufficient to fill out the remaining valences of Me.

Preferred metallocenes include those metallocenes which contain a substituent which is copolymerizable with an olefin. An even more preferred group would be bridged metallocenes in which the polymerizable substituent is on the bridge. Examples of such polymerizable substituents include alkenyl and alkynel groups. Although bridged metallocenes are preferred to unbridged metallocenes, both are considered applicable to the present invention. Non-limiting examples of bridged metallocenes having fluorenyl-containing components and methods for making same are disclosed in U.S. Pat. No. 5,594,078 which is fully incorporated herein by reference.

The term fluorenyl as used herein refers to 9-fluorenyl unless specifically indicated as otherwise. Accordingly, the term fluorenyl and 9-fluorenyl should be viewed as equivalent unless indicated otherwise.

The organoaluminoxane component used in preparing the inventive solid catalyst system is an oligomeric aluminum compound having repeating units of the formula:

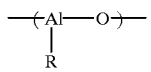

Some examples are often represented by the general formula:

or

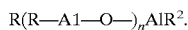

In the general aluminoxane formula, R is a $C_1$–$C_5$ alkyl radical, for example, methyl, ethyl, propyl, butyl or pentyl and "n" is an integer from 1 to about 50. Most preferably, R is methyl and "n" is at least 4. Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally the reaction of an aluminum alkyl with a limited amount of water is postulated to yield a mixture of the linear and cyclic species of the aluminoxane.

Before being contacted with the modified support, the metallocene and aluminoxane are combined in the presence of a suitable liquid to form a liquid catalyst system. The amount of aluminoxane and metallocene used in forming the liquid catalyst system can vary over a wide range. Typically, however, the molar ratio of aluminum in the aluminoxane to transition metal of the metallocene is in the range of about 1:1 to about 20,0000:1, more preferably, a molar ratio of about 50:1 to about 600:1 is used.

It is preferred that the liquid catalyst system be prepared using an organic liquid in which the aluminoxane is at least partially soluble. The currently preferred liquids are hydrocarbons such as hexane or toluene. Typically, an aromatic liquid solvent is employed. Examples include benzene, toluene, ethylbenzene, diethylbenzene, and the like. The amount of liquid to be employed is not particularly critical. Nevertheless, the amount should preferably be such as to dissolve the product of the reaction between the metallocene and the aluminoxane, to provide desirable polymerization viscosity for pre-polymerization, and to permit good mixing. The temperature is preferably kept below that which would cause the metallocene to decompose. Typically the temperature would be in the range of –50° C. to 100° C. Preferably, the metallocene, the aluminoxane, and the liquid diluent are combined at room temperature, i.e. around 10° to 30° C. The reaction between the aluminoxane and the metallocene is relatively rapid. The reaction rate can vary depending upon the ligands of the metallocene. It is generally desired that the aluminoxane and metallocene be contacted for about one minute to about one hour. Upon completion of the reaction, a liquid catalyst system will have been formed.

The liquid catalyst system is contacted with the modified support by mixing the liquid catalyst system with the above modified support. Preferably, the liquid catalyst is added to the support with vigorous stirring. The modified support is used in an amount such that the weight ratio of the metallocene to the support is in the range of about 0.00001/1 to 1/1, more preferably 0.005/1 to 0.05/1. The supported catalyst system is precipitated and washed with hexane or another suitable solvent. The catalyst system prepared in this manner to have a modified support yields polypropylene productivity increases of more than a factor of two.

Even further polyolefin productivity increases may be realized within the scope of the present invention by carrying out prepolymerization in the presence of the supported catalyst system. The prepolymerization is conducted in the supported catalyst system, which can be a solution, a slurry, or a gel in a liquid.

Typically, the prepolymerization will be conducted using an olefin. A wide range of olefins can be used for the prepolymerization, preferably one selected from nonaromatic alpha-olefins, such as ethylene and propylene. It is within the scope of the invention to use a mixture of olefins, for example, ethylene and a higher alpha olefin can be used for prepolymerization. The use of a higher alpha olefin such as 1-butene with ethylene is believed to increase the amount of copolymerization occurring between the olefin monomer and the olefinically unsaturated portion of the metallocene.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about –30° C. to about +110° C., more preferably in the range of about +10° C. to about +30° C. The amount of prepolymer can be varied but typically would be in the range of from about 1 to about 95 wt. % of the resulting prepolymerized solid catalyst system, more preferably about 5 to 80 wt. %. It is generally desirable to carry out the prepolymerization to at least a point where substantially all of the metallocene is in the solid rather than in the liquid to maximize the use of the metallocene.

After prepolymerization, the resulting solid prepolymerized catalyst is separated from the liquid of the reaction mixture. Various techniques known in the art can be used for carrying out this step. After separating the solid from the liquid, the resulting solid is preferably washed with a hydrocarbon and then dried using high vacuum to remove substantially all the liquids and other volatile components that might still be associated with the solid. The vacuum drying is preferably carried out under relatively mild conditions, i.e. temperatures below 100° C. More typically the prepolymerized solid is dried by subjection to a high vacuum at a temperature of about 30° C. until a substantially constant weight is achieved. A preferred technique employs at least one initial wash with an aromatic hydrocarbon such as toluene, followed by several washes with a paraffinic hydrocarbon such as pentane, and then vacuum drying.

It is within the scope of the present invention to contact the prepolymerization reaction mixture product with a liquid in which the prepolymer is sparingly soluble, i.e. a counter solvent for the prepolymer, to help cause soluble prepolymer to precipitate from the solution. Such a liquid is also useful for the subsequent washing of the prepolymerized solid. The liquid mixture resulting from the prepolymerization of the inventive solid prepolymerized catalyst can be subjected to sonification to help break up particles if desired.

Further, if desired, the recovered solid prepolymerized catalyst system can be screened to give particles having sizes that meet the particular needs for a particular type of polymerization.

Another option is to combine the recovered inventive solid prepolymerized catalyst system with an inert hydrocarbon, such as one of the types used as a wash liquid, and then to remove that liquid using a vacuum. In such a process it is sometimes desirable to subject the resulting mixture to sonification before stripping off the liquid.

The resulting solid prepolymerized metallocene containing catalyst system is useful for the polymerization of olefins. Generally, it is not necessary to add any additional aluminoxane to this catalyst system. In some cases it may be found desirable to employ small amounts of an organoaluminum compound as a scavenger for poisons. The term organoaluminum compounds include compounds such as trimethylaluminum, trimethylaluminum, diethylaluminium chloride, ethylaluminum dichloride, ethylaluminum sesquichloride, and the like. Trialkyl aluminum compounds are currently preferred. Also in some applications it may be desirable to employ small amounts of antistatic agents which assist in preventing the agglomeration of polymer particles during polymerization. Still further, when the inventive catalyst system is added to a reactor as a slurry in a liquid, it is sometimes desirable to add a particulate dried solid as a flow aid for the slurry. Preferably the solid has been dried using one of the methods described earlier. Inorganic oxides such as silica or polyolefin "fluff" are particularly preferred. Currently, it is preferred to use a fumed silica such as that sold under the trade name Cab-o-sil. Generally the fumed silica is dried using heat and trimethylaluminum.

The solid catalyst system is particularly useful for the polymerization of alpha-olefins having 2 to 10 carbon atoms. Examples of such olefins include ethylene, propylene, butene-1, pentene-1, 3-methylbutene-1, hexenepropylene, 4-methylbutene-1, 3-methylpentene-1, heptene-1, octene-1, decene-1, 4,4-dimethyl-1-pentene, 4,4-diethyl-1-1hexene, 3,4-dimethyl-1-hexene, and the like and mixtures thereof. The catalysts are also useful for preparing copolymers of ethylene and propylene and copolymers of ethylene or propylene and one or more higher molecular weight olefins.

The polymerizations can be carried out under a wide range of conditions depending upon the particular metallocene employed and the particular results desired. Although the inventive catalyst system is a solid, it is considered that it is useful for polymerization conducted under solution, slurry, or gas phase reaction conditions.

When the polymerizations are carried out in the presence of liquid diluents obviously it is important to use diluents which do not have an adverse effect upon the catalyst system. Typical liquid diluents include propylene, propane, butane, isobutane, pentane, hexane, heptene, octane, cyclohexane, methylcyclohexane, toluene, xylene, and the like. Typically the polymerization temperature can vary over a wide range, temperatures typically would be in a range of about −60° C. to about 300° C., more preferably in the range of about 20° C. to about 160° C. Typically the pressure of the polymerization would be in the range of from about 1 to about 500 atmospheres or even greater. Thus inventive catalyst system is particularly useful for polymerizations carried out in particle form, i.e., slurry-type polymerization conditions.

The polymers produced in accord with this invention have a wide range of uses that will be apparent to those skilled in the art from the physical properties of the respective polymers. Applications such as moldings, films, adhesives, and the like are included. The present invention provides a method and catalyst system which can provide polyolefins having a broad molecular weight distribution.

A further understanding of the present invention, its various aspects, objects and advantages will be provided by the following examples.

EXAMPLES

Unless otherwise specified, all preparations for experiments were carried out under an inert gas atmosphere. All solvents were purchased from commercial sources and dried over activated alumina. Trimethylaluminum (TMA) was purchase as a 2.0 M or 15 wt. % solution in toluene from commercial sources. Methylaluminoxane (MAO) was purchased from commercial sources as a 10 or 30 wt. % solution in toluene.

The silicon dioxide used for all experiments was Davison 952. For each example, an approximately 150 gram portion of the silicon dioxide was put in a ceramic tray and placed in a muffle furnace with ambient air. The temperature of the furnace was increased at a rate of 10° C./min. until the desired temperature was reached.

Unless indicated more specifically below, the procedures for TMA treatment of the silica, preparation of the catalyst and polymerization of polyethylene were as follows:

The silica for all examples was then slurried in toluene (about 4 ml/g silica) and 1 ml of 2.0 M TMA was added per gram of silica and the resulting solution was stirred for one hour. The solid was filtered and washed with about 1 ml pentane per gram of Silica and dried under high vacuum for 1.5 hours.

Each polymerization was conducted in a one gallon, stirred autoclave reactor. A small amount of the catalyst system was combined with two liters of isobutane in the reactor. The reactor temperature was raised to about 88° C. and hydrogen was added. The amount of hydrogen was determined as a 10 psi pressure drop on a 300 cc pressure vessel. The reactor was brought to a polymerization temperature of about 90° C. Then ethylene was introduced into the reactor so that the total reactor pressure was about 450 psig. The reactor pressure was maintained at 450 psig throughout a one-hour run by continuous introduction of ethylene. Then the reactor was vented to remove the volatile components and the polymer was collected as a dry fluff.

The Melt Index (MI) of the resins in the examples was determined using ASTM 01238 Condition E; High Load Melt Index by ASTM 01238 Condition E; and Density using ASTM D1505-68.

Catalyst 1

Silica Dried at 30° C.

Two grams of the TMA treated silica were slurried in toluene. A premixed solution was prepared by adding 36.4 mg of the metallocene (1-cyclopentadienyl-1-flourenyl-1-but-3-enyl-1-methyl methane zirconium dichloride) to 10.5 ml of MAO (10 wt % in toluene) and stirring for 15 minutes. The premixed catalyst solution was then added to the silica slurry, and the mixture was stirred for 15 minutes.

Once the stirring of the mixture was completed, gaseous ethylene was added at 5 psig and room temperature to the premixed catalyst solution and silica slurry mixture. After 40 minutes of interaction with the ethylene, the mixture weighed an additional 1.6619 grams.

The mixture was then washed once with a 20 ml portion of toluene and twice with 20 ml portions of pentane. The filtrate was then dried for 1 hour under a high vacuum.

The above procedure produced an isolated solid product weighing 3.681 grams.

Catalyst 2

Silica Dried at 200° C.

In this run, two grams of the TMA treated silica were slurried in toluene. A premixed solution was prepared by adding 36.4 mg of the metallocene (1-cyclopentadienyl-1-flourenyl-1-but-3-enyl-1-methyl methane zirconium dichloride) and 10.5 ml of MAO (10 wt % in toluene) and stirring for 15 minutes. The premixed solution was then added to the silica-toluene slurry and stirred for 15 minutes.

Upon completion of stirring, gaseous ethylene was added at 5 psig and room temperature to the premixed catalyst solution and silica slurry mixture. After 1 hour and 42 minutes of contact, the mixture weighed an additional 1.643 grams.

The mixture was then washed once with a 20 ml portion of toluene and twice with 20 ml portions of pentane. The filtrate was then dried for 1 hour under a high vacuum.

The above procedure produced an isolated solid product weighing 3.118 grams.

Catalyst 3

Silica Dried at 400° C.

In this run, two grams of the TMA treated silica were slurried in toluene. A premixed solution was prepared by adding 36.4 mg of the metallocene (1-cyclopentadienyl-1-flourenyl-1-but-3-enyl-1-methyl methane zirconium dichloride) and 10.5 ml of MAO (10 wt % in toluene) and stirring for 15 minutes. The premixed solution was then added to the silica-toluene slurry and stirred for 15 minutes.

Upon completion of stirring, gaseous ethylene was added at 5 psig and room temperature to the premixed catalyst solution and silica slurry mixture. After 1 hour and 6 minutes of contact, the mixture weighed an additional 1.6131 grams.

The mixture was then washed once with a 20 ml portion of toluene and twice with 20 ml portions of pentane. The filtrate was then dried for 1 hour under a high vacuum.

The above procedure produced an isolated solid product weighing 3.247 grams.

Catalyst 4

Silica Dried at 600° C.

In this run, two grams of the TMA treated silica were slurried in toluene. A premixed solution was prepared by adding 36.4 mg of the metallocene (1-cyclopentadienyl-1-flourenyl-1-but-3-enyl-1-methyl methane zirconium dichloride) and 10.5 ml of MAO (10 wt % in toluene) and stirring for 15 minutes. The premixed solution was then added to the silica-toluene slurry and stirred for 15 minutes.

Upon completion of stirring, gaseous ethylene was added at 5 psig and room temperature to the premixed catalyst solution and silica slurry mixture. After 1 hour and 20 minutes of interaction, the mixture weighed an additional 1.6028 grams.

The mixture was then washed once with a 20 ml portion of toluene and twice with 20 ml portions of pentane. The filtrate was then dried for 1 hour under a high vacuum.

The above procedure produced an isolated solid product weighing 3.542 grams.

Catalyst 5

Silica Dried at 800° C.

In this run, two grams of the TMA treated silica were slurried in toluene. A premixed solution was prepared by adding 36.4 mg of the metallocene (1-cyclopentadienyl-1-flourenyl-1-but-3-enyl-1-methyl methane zirconium dichloride) and 10.5 ml of MAO (10 wt % in toluene) and stirring for 15 minutes. The premixed solution was then added to the silica-toluene slurry and stirred for 15 minutes.

Upon completion of stirring, gaseous ethylene was added at 5 psig and room temperature to the premixed catalyst solution and silica slurry mixture. After 1 hour and 20 minutes of contact, the mixture weighed an additional 1.939 grams.

The mixture was then washed once with a 20 ml portion of toluene and twice with 20 ml portions of pentane. The filtrate was then dried for 1 hour under a high vacuum.

The above procedure produced an isolated solid product weighing 3.473 grams.

Catalyst 6

Silica Dried at 954° C.

In this run, two grams of the TMA treated silica were slurried in toluene. A premixed solution was prepared by adding 36.4 mg of the metallocene (1-cyclopentadienyl-1-flourenyl-1-but-3-enyl-1-methyl methane zirconium dichloride) and 10.5 ml of MAO (10 wt % in toluene) and stirring for 15 minutes. The premixed solution was then added to the silica-toluene slurry and stirred for 15 minutes.

Upon completion of stirring, gaseous ethylene was added at 5 psig and room temperature to the premixed catalyst solution and silica slurry mixture. After 1 hour and 20 minutes of contact, the mixture weighed an additional 1.916 grams.

The mixture was then washed once with a 20 ml portion of toluene and twice with 20 ml portions of pentane. The filtrate was then dried for 1 hour under a high vacuum.

The above procedure produced an isolated solid product weighing 3.73 grams.

EXAMPLE 7

Mixed Catalyst Polymerization

One Silica Portion Dried at 30° C. and One Silica Portion Dried at 954° C.

In this run 0.053 grams of the catalyst formed using the silica dried at 30° C. (from Example 1) and 0.027 grams of the catalyst formed using the silica dried at 954° C. (from Example 6) were placed in the reactor separately and run together.

The reactor was operated for 1 hour and 4 minutes at 90° C. with an ethylene feed. The resulting mixed fluff was then blended together on a roll mill and the properties measured. Specifically, the polymer produced with the hybrid catalyst generated an HLMI/MI value of 28.

TABLE 1

DRYING TEMPERATURE STUDY

| EX. | DRYING TEMP. | PROD g/g/hr | MI | HLMI | HLMI/ MI | Den. | HI |
|---|---|---|---|---|---|---|---|
| 1 | 30° C. | 4960 | 0.54 | 12.48 | 23 | 0.9444 | 2.8 |
| 2 | 200° C. | 8030 | 0.69 | 16.25 | 24 | 0.9436 | 3.1 |
| 3 | 400° C. | 11100 | 0.88 | 18.06 | 21 | 0.9442 | 3.1 |
| 4 | 600° C. | 9330 | 1.05 | 16.37 | 16 | 0.9442 | 2.6 |
| 5 | 800° C. | 11070 | 1.32 | 22.16 | 17 | 0.9456 | 2.4 |
| 6 | 954° C. | 9660 | 3.36 | 71.69 | 21 | 0.9507 | 3.2 |
| 7 | 30° C. 954° C. | 2820 | 0.53 | 33.7 | 28 | 0.9492 | 3.3 |

Table 1 provides the results of ethylene polymerization processes conducted with the catalyst systems produced in Examples 1–6. In each case, the catalyst system was placed in a reactor and contacted with an ethylene flow for a specified amount of time. The resulting fluff was mixed on a roll mill and examined for the physical properties listed above. Specifically, the catalyst systems were evaluated for productivity (g/g/hr) and molecular weight distributions HI.

As can be seen from Table 1, Catalysts 1–6 and Example 7, varying the conditions of drying the solid phase inorganic oxide-metallocene catalyst results in catalyst systems yield polyolefins having different molecular weight distributions. This can be seen by examining the column for HI. The higher the number for HI, the broader the molecular weight distribution. Example 7, a combinations of a catalyst formed using a silica support dried at high temperature (i.e., 940° C.) and a catalyst formed using a silica support dried at low temperature (i.e., 30° C.), yielded the broadest molecular weight distribution.

It will be clear that the present invention is well adapted to attain the ends and advantages mentioned as well as those inherent therein. While presently preferred embodiments have been described for purposes of disclosure, numerous changes may be made which will readily suggest themselves to those skilled in the art and which are encompassed in the spirit of the invention disclosed and as defined in the appended claims.

What is claimed is:

1. A process for preparing a supported metallocene catalyst system useable to catalyze formation of polyolefins with a wide molecular weight distribution comprising the steps of:
   (a) drying a first portion of an inorganic oxide under a first set of conditions, wherein upon treatment with an organoaluminoxane and a metallocene, a first catalyst system is formed usable to produce a polyolefin product having a first weight average molecular weight;
   (b) drying a second portion of an inorganic oxide under a second set of conditions such that said first and second portions have different levels of dryness wherein, upon treatment with an organoaluminoxane and a metallocene, a second catalyst system is formed usable to produce polyolefin product having a second weight average molecular weight;
   (c) mixing an amount of the first portion with an amount of the second portion to produce a final inorganic oxide support; and
   (d) combining the final inorganic oxide support with an organoaluminoxane and a metallocene to produce a supported metallocene catalyst system usable to catalyze formation of polyolefins with a broadened molecular weight distribution.

2. The process of claim 1 wherein each of the inorganic oxide portions are dried by a process which comprises the step of thermal treatment.

3. The process of claim 2 wherein thermally treating the support comprises calcining.

4. The process of claim 1 wherein each of the inorganic oxide samples are thermally dried at different temperatures between about 20° C. and about 1000° C.

5. The process of claim 3 wherein the process of drying the inorganic oxide portions further comprises the step of chemically treating the inorganic oxide by contact with a chemical dehydrating agent.

6. The process of claim 5 wherein the chemical dehydrating agent is selected from the group consisting of trimethylaluminum, ethyl magnesium chloride and chlorosilanes.

7. The process of claim 1 wherein the inorganic oxide is selected from the group consisting of silica, alumina, silica-alumina, and mixtures thereof.

8. The process of claim 1 wherein the metallocene is selected from the group consisting of metallocenes which are in accordance with the formula $R_x(Z)(Z)MeQ_k$ wherein each Z is bound to Me, is individually selected and is a cyclopentadienyl-type ligand selected from substituted or unsubstituted cyclopentadienyl, indenyl, benzoindenyl, tetrahydroindenyl, benzofluorenyl, octahydrofluorenyl, and fluorenyl ligands, as well as derivatives thereof;

wherein R is a structural bridge linking the Z's and is selected from the group consisting of hydrocarbyl groups, hydrocarbyloxy groups, silicon containing hydrocarbyl groups, germanium containing hydrocarbyl groups, tin containing hydrocarbyl groups, phosphorus containing hydrocarbyl groups, and nitrogen containing hydrocarbyl groups each having 1 to 20 carbon atoms;

wherein Me is a metal selected from the group consisting of Group 4, 5, and 6 metals of the Periodic Table;

wherein each Q is individually selected and is selected from the group consisting of hydrogen, halogens, hydrocarbyl groups having 1 to 20 carbon atoms, alkoxy groups having 1 to 20 carbon atoms, amino groups which may or may not be substituted with up to two hydrocarbyl groups having 1 to 20 carbon atoms, a phosphorus-containing hydrocarbyl group having 1 to 20 carbon atoms, a silicon-containing hydrocarbyl group having 1 to 20 carbon atoms and an aluminum-containing hydrocarbyl group having 1 to 20 carbon atoms;

wherein x is 1 or 0; and wherein k is a number sufficient to fill out the remaining valences of Me.

9. The process of claim 8 wherein the metallocene is further selected from the group of metallocenes which contain a substituent which is copolymerizable with an olefin.

10. The process of claim 8 wherein the metallocene selected is a bridged metallocene containing a substituent which is copolymerizable with an olefin and where the substituent is located on the bridge.

11. The process of claim 1 wherein the organoaluminoxane is selected from the group consisting of oligomeric aluminum compounds having repeating units of the formula

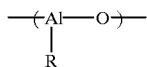

wherein R is a $C_1$–$C_5$ alkyl radical.

12. The process of claim 1 wherein the organoaluminoxane is methylaluminoxane.

13. A process for polymerizing an olefin using a supported metallocene catalyst system comprising the steps of:
(a) drying a first portion of an inorganic oxide under a first set of conditions, wherein upon treatment with an organoaluminoxane and a metallocene, a first catalyst system is formed usable to produce a polyolefin product having a first weight average molecular weight;
(b) drying a second portion of an inorganic oxide under a second set of conditions such that said first and second portions have different levels of dryness wherein, upon treatment with an organoaluminoxane and a metallocene, a second catalyst system is formed usable to produce polyolefin product having a second weight average molecular weight;
(c) mixing an amount of the first portion with an amount of the second portion to produce a final inorganic oxide support;
(d) combining the final inorganic oxide support with an organoaluminoxane and a metallocene to produce a supported metallocene catalyst system usable to catalyze formation of polyolefins with a broadened molecular weight distribution; and
(e) contacting an olefin with the final metallocene catalyst system under conditions supporting polymerization.

14. The process of claim 13 wherein each of the inorganic oxide portions are dried by a process which comprises the step of thermal treatment.

15. The process of claim 14 wherein each of the inorganic oxide portions are thermally dried at different temperatures between about 20° C. and about 1000° C.

16. The process of claim 15 wherein the process of drying the inorganic oxide portions further comprises the step of chemically treating the inorganic oxide by contact with a chemical dehydrating agent.

17. The process of claim 16 wherein the chemical dehydrating agent is selected from the group consisting of trimethylaluminum, ethyl magnesium chloride and chlorosilanes.

18. The process of claim 17 wherein the metallocene is selected from the group consisting of metallocenes which are in accordance with the formula $R_x(Z)(Z)MeQ_k$
wherein each Z is bound to Me, is individually selected and is a cyclopentadienyl-type ligand selected from substituted or unsubstituted cyclopentadienyl, indenyl, benzoindenyl, tetrahydroindenyl, benzofluorenyl, octahydrofluorenyl, and fluorenyl ligands, as well as derivatives thereof;
wherein R is a structural bridge linking the Z's and is selected from the group consisting of hydrocarbyl groups, hydrocarbyloxy groups, silicon containing hydrocarbyl groups, germanium containing hydrocarbyl groups, tin containing hydrocarbyl groups, phosphorus containing hydrocarbyl groups, and nitrogen containing hydrocarbyl groups each having 1 to 20 carbon atoms;
wherein Me is a metal selected from the group consisting of Group IVB, VB, and VIB metals of the Periodic Table;
wherein each Q is individually selected and is selected from the group consisting of hydrogen, halogens, hydrocarbyl groups having 1 to 20 carbon atoms, alkoxy groups having 1 to 20 carbon atoms, amino groups which may or may not be substituted with up to two hydrocarbyl groups having 1 to 20 carbon atoms, a phosphorus-containing hydrocarbyl group having 1 to 20 carbon atoms, a silicon-containing hydrocarbyl group having 1 to 20 carbon atoms and an aluminum-containing hydrocarbyl group having 1 to 20 carbon atoms;
wherein x is 1 or 0; and
wherein k is a number sufficient to fill out the remaining valences of Me.

19. The process of claim 18 wherein the metallocene is further selected from the group of metallocenes which contain a substituent which is copolymerizable with an olefin.

20. The process of claim 18 wherein the metallocene selected is a bridged metallocene containing a substituent which is copolymerizable with an olefin and where the substituent is located on the bridge.

21. The process of claim 18 wherein the organoaluminoxane is selected from the group consisting of oligomeric aluminum compounds having repeating units of the formula

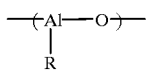

wherein R is a $C_1$–$C_5$ alkyl radical.

22. The process of claim 18 wherein the organoaluminoxane is methylaluminoxane.

23. A process for preparing a supported metallocene catalyst system useable to catalyze formation of polyolefins with a wide molecular weight range comprising the steps of:
(a) drying a first portion of an inorganic oxide under a first set of conditions;
(b) combining the first portion with an organoaluminoxane and a metallocene to create a first catalyst system usable to produce a polyolefin product having a first weight average molecular weight;
(c) drying a second portion of an inorganic oxide under a second set of conditions such that said first and second portions have differing levels of dryness;
(d) combining the second portion with an organoaluminoxane and a metallocene to create a second catalyst system usable to produce a polyolefin product having a second weight average molecular weight; and
(e) mixing an amount of the first catalyst system with an amount of the second catalyst system to form a combined catalyst system usable to catalyze the formation of polyolefins having a broadened molecular weight distribution.

24. The process of claim 23 wherein each of the inorganic oxide portions are dried by a process which comprises the step of thermal treatment.

25. The process of claim 24 wherein thermally treating the support comprises calcining.

26. The process of claim 24 wherein each of the inorganic oxide samples are thermally dried at different temperatures between about 20° C. and about 1000° C.

27. The process of claim 25 wherein the process of drying the inorganic oxide portions further comprises the step of chemically treating the inorganic oxide by contact with a chemical dehydrating agent.

28. The process of claim 27 wherein the chemical dehydrating agent is selected from the group consisting of trimethylaluminum, ethyl magnesium chloride and chlorosilanes.

29. The process of claim 28 wherein the metallocene is selected from the group consisting of metallocenes which are in accordance with the formula $R_x(Z)(Z)MeQ_k$ wherein each Z is bound to Me, is individually selected and is a cyclopentadienyl-type ligand selected from substituted or unsubstituted cyclopentadienyl, indenyl, benzoindenyl, tetrahydroindenyl, benzofluorenyl, octahydrofluorenyl, and fluorenyl ligands, as well as derivatives thereof;

wherein R is a structural bridge linking the Z's and is selected from the group consisting of hydrocarbyl groups, hydrocarbyloxy groups, silicon containing hydrocarbyl groups, germanium containing hydrocarbyl groups, tin containing hydrocarbyl groups, phosphorus containing hydrocarbyl groups, and nitrogen containing hydrocarbyl groups each having 1 to 20 carbon atoms;

wherein Me is a metal selected from the group consisting of Group IVB, VB, and VIB metals of the Periodic Table;

wherein each Q is individually selected and is selected from the group consisting of hydrogen, halogens, hydrocarbyl groups having 1 to 20 carbon atoms, alkoxy groups having 1 to 20 carbon atoms, amino groups which may or may not be substituted with up to two hydrocarbyl groups having 1 to 20 carbon atoms, a phosphorus-containing hydrocarbyl group having 1 to 20 carbon atoms, a silicon-containing hydrocarbyl group having 1 to 20 carbon atoms and an aluminum-containing hydrocarbyl group having 1 to 20 carbon atoms;

wherein x is 1 or 0; and wherein k is a number sufficient to fill out the remaining valences of Me.

30. The process of claim 29 wherein the organoaluminoxane is selected from the group consisting of oligomeric aluminum compounds having repeating units of the formula

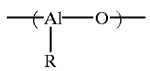

wherein R is a $C_1$–$C_5$ alkyl radical.

31. The process of claim 29 wherein the organoaluminoxane is methylaluminoxane.

32. A process for producing a polyolefin comprising contacting an olefin under polymerization conditions with a catalyst system prepared by contacting a metallocene and an organoaluminoxane with first and second portions of an inorganic oxide wherein the first and second portions of the inorganic oxide have been dried to different levels of dryness such that the molecular weight distribution of the resulting polymer is broader than that of a polyolefin produced under the same conditions using said metallocene and organoaluminoxane but using only one of either of said first or second portions of inorganic oxide.

33. A process according to claim 32 wherein the first and second portions of the inorganic oxide are combined with each other before being combined with the metallocene and aluminoxane.

34. A process according to claim 32 wherein said first and second portions of said inorganic oxide are independently contacted with the metallocene and the aluminoxane and then combined with each other.

35. A process according to claim 32 wherein said inorganic oxide comprises silica.

36. A process according to claim 32 wherein said metallocene is a bridged metallocene containing a substituent which copolymerizes with an olefin.

37. A process according to claim 36 wherein the metallocene is 1-(cyclopentadienyl)-1-(fluorenyl)-1-(but-3-enyl)-1-methyl methane zirconium dichloride and the aluminoxane is methyl aluminoxane.

38. A process according to claim 37 wherein both portions of the inorganic oxide are dried with trimethyl aluminum under similar conditions and then subjected to thermal drying under different conditions.

39. A process according to claim 38 wherein one portion of the inorganic oxide is dried at a temperature of about 30° C. and the other portion of the silica is dried at a temperature of about 954° C.

* * * * *